United States Patent [19]

McGraw et al.

[11] Patent Number: 4,993,027
[45] Date of Patent: Feb. 12, 1991

[54] METHOD AND APPARATUS FOR DETERMINING MICROPROCESSOR KERNAL FAULTS

[75] Inventors: Joseph M. McGraw, Lewisburg; David E. Campbell, Maxwelton, both of W. Va.

[73] Assignee: Pace, Incorporated, Laurel, Md.

[21] Appl. No.: 242,685

[22] Filed: Sep. 9, 1988

[51] Int. Cl.$^5$ .............................................. G06F 11/00
[52] U.S. Cl. .................................... 371/16.2; 371/22.4
[58] Field of Search ...................... 371/16.2, 22.4, 25.1

[56] References Cited

U.S. PATENT DOCUMENTS

| | | | |
|---|---|---|---|
| 4,192,451 | 3/1980 | Swerling et al. | 371/16.2 |
| 4,455,654 | 6/1984 | Bhaskar et al. | 371/16.2 |
| 4,567,592 | 1/1986 | Minicilli | 371/16.2 |
| 4,622,647 | 11/1986 | Sagnard et al. | 371/16.2 |
| 4,674,089 | 6/1987 | Poret et al. | 371/16.2 |
| 4,691,316 | 9/1987 | Phillips | 371/16.2 |
| 4,718,064 | 1/1988 | Edwards et al. | 371/16.2 |
| 4,796,258 | 1/1989 | Boyce | 371/16.2 |

Primary Examiner—Charles E. Atkinson
Attorney, Agent, or Firm—Sixbey, Friedman, Leedom & Ferguson

[57] ABSTRACT

Method and apparatus for testing the address/data paths between the ROM and CPU of a computer where the computer includes a first connector adapted to connect the ROM to the address/data paths so that data can be transferred between the CPU and the ROM via the data paths of the address/data paths and a second connector adapted to connect the CPU to the address/data paths so that addresses can be applied to an address decoder for the ROM via the address lines of the address/data paths. A memory is connected to the address decoder and the data lines via the first connector, the memory storing predetermined data at a plurality of memory locations. A kernel debugging module connected to the address/data paths via the second connector includes circuitry for successively applying read signals which emulate those provided by the CPU to successively read the predetermined data stored at the memory locations. Comparison circuitry is also provided for successively comparing (i) the predetermined data as it occurs at at least one selected node of the tested address/data paths with (ii) the same data as it occurs at the selected node in address/data paths known to be fault free until all of the predetermined data has been read to thus determine if the tested address/data paths are fault free at the selected node. Also disclosed are ROM function, stuck lines, and memory map routines.

12 Claims, 8 Drawing Sheets

METHOD AND APPARATUS FOR DETERMINING MICROPROCESSOR KERNAL FAULTS

FIELD OF THE INVENTION

The present invention relates to a method and circuitry for testing microprocessors and the like and, in particular, for determining kernel faults in conjunction with the rom emulation troubleshooting technique.

BACKGROUND OF THE INVENTION

The advent of microprocessors and microcomputers has provided electronic system designers greater functionality, higher speed and increased problem solving capability in digital computer systems. Microprocessors, running at clock speeds of 15 megahertz and above, are common tools of today's engineers. Chip designers are producing microprocessors and VLSI devices of orders of magnitude improvements in line width, gate count and clock speed. While microprocessor vendors are making these advances, test equipment vendors and test engineers struggle to devise new means to test these parts.

Microprocessor systems contain address, data and control lines, which depend upon feedback to operate. In doing so, the CPU sends out an address on address lines to memory, which outputs data on data lines which is fed back to the CPU. The CPU may write data to memory, using these address and data lines, controlled through specific logic signals on control lines. This information flow in both directions is the main difference between microprocessor systems versus conventional digital logic systems. Differences such as this have forced test equipment vendors to innovate new test tools with respect to microprocessor systems.

Emulator is the general name for one of these test tools which has been developed to access and control microprocessor based systems, for both hardware and software design, and for troubleshooting. Emulators for troubleshooting, as used in automatic testing, are commercially available in two main types: CPU type emulators and rom (read-only-memory) emulators. The use of a CPU type emulator, which is very powerful in its ability to control and exercise the circuitry system surrounding the CPU, is expensive because a different emulator is required for each different microprocessor type tested, to wit: a CPU type emulator is specific for each microprocessor under test.

On the other hand, rom emulators plug into the "bootstrap" or reset logical address space of the UUT system. These emulators are transparent to the UUT (unit-under-test) CPU, and appear as simply memory from which test routines, previously loaded into rom emulator memory (which is actually read/write memory), can be executed. The use of rom emulation is enjoying widespread acceptance commercially, because of low cost. As most rom devices found in microprocessor systems employ a JEDEC standard package type thereby allowing a standardization among rom plug types (the part which actually inserts into the rom socket) a rom emulator can easily interface existing connections of the UUT. Further, rom emulators are also software configurable, giving the capability to test many types of UUT CPUs with one rom emulator.

Testing at higher UUT CPU speeds is generally easier because most roms are slower than other system components and the UUT CPU is generally programmed to "wait" during rom accesses to allow the rom to "catch up" to the UUT CPU. This allows the read/write memory in the rom emulator a liberal amount of time to respond to UUT CPU instruction fetches. The effect of these programmed wait states increases the reliability of testing at high UUT CPU speeds and alleviates costs associated with testing high speed processors inherent in CPU type emulators.

However, there is one major drawback with the rom emulation technique. If there is a stuck, open or shorted address, data or control signal between the UUT CPU and the UUT rom, or the portion of the UUT CPU "kernel" which controls data access from the UUT rom location, the UUT CPU is unable to fetch the proper instruction sequence from the UUT rom.

CPU emulation does not suffer this limitation since the emulator CPU is located in the emulator, and is buffered by gates from any stuck or inoperative lines. A CPU type emulator contains its own ram, buffered and isolated from any UUT stuck or faulty address, data or control lines. In other words, a CPU type emulator's rom-to-CPU-address/data path is isolated and immune from stuck lines in the UUT. By its very construction a rom emulator is not so isolated and immune from stuck lines in the UUT.

To overcome the stuck kernel fault, when using the lower cost rom emulator, known methods have ranged from manual current pulser/tracer techniques to logic timing analyzers. But such methods have drawbacks as the problem presented by a stuck kernel fault is very difficult to pinpoint because the event sequence, spanning not more than a few microseconds, occurs only once each time the first instruction fetches are executed and fail.

FIG. 4 and the following explanation describe the typical sequence of events whenever the UUT CPU commences operation after initialize reset:

Time (1) address is put on address bus by CPU,

Time (2) address latch enable is asserted by CPU,

Time (3) address is latched by external address latches,

Time (4) address arrives at rom sockets from address latches,

Time (5) concurrent with 4 above, address high order bits arrive at memory decode circuit, Time (6) memory decoder decodes address high order bits and asserts its enable output, Time (7) enable output arrives at chip select input of rom socket, Time (8) read line is asserted at CPU, Time (9) read pulse arrives at rom socket and enables rom data outputs, Time (10) rom data is output from rom, Time (11) rom data pass through data buffers, Time (12) rom data outputs arrive at CPU whereby the address, data and control paths have been successfully exercised.

To diagnose faults during this sequence, one must simultaneously view all address lines, all data lines and certain control lines and the time at which the fault occurred must be captured, along with events succeeding it in time. To accomplish this, a means of triggering upon detection of a certain logic pattern is necessary; also the means of storing logic patterns at the various nodes is required. A logic analyzer is the usual tool for such diagnosis but is expensive and large, and usually requires manually clipping many test leads into various places in the kernel.

While a simpler logic analyzer approach can be taken which examines fewer lines at a time by moving fewer test leads around the different nodes and executing the UUT CPU reset to start the sequence numerous times. This technique is fraught with problems because the process of elimination is very subject to operator interpretation and is long and involved, requiring reiterations for collection and analysis of results.

Alternatively, a logic pulser and accompanying logic probe and current tracer can be effective in tracing stuck nodes in the kernel. But this technique requires a highly skilled technician who can accurately interpret results. Further, as it is slow and very time consuming, it is inadequate for high volume testing.

A solution is required for automatically analyzing failed nodes within the UUT rom-to-CPU-address/data path which is less costly and cumbersome than using a logic timing analyzer, which does not entail movement of many leads to different nodes numerous times, and which does not require error prone interpreted measurements.

SUMMARY OF THE INVENTION

A basic problem with the present prior art is that it employs the UUT CPU as the signal source. However, this signal source is non-recurring each time a reset-start occurs, and non-recurring signals are much more difficult to analyze than repeating signals. Thus, in accordance with an important aspect of the present invention the UUT nodes repetitively stimulated so that easy-to-use data compression techniques such as digital signature analysis can be used to pinpoint faults in the UUT.

It is a further object of this invention to provide a method and apparatus, when testing microprocessor based systems or the like with a rom based emulation technique, for finding and diagnosing faults within the microprocessor address lines, data lines and pertinent control lines or associated circuitry, which would normally render the rom emulation device unable to operate.

It is a another object of this invention that the means provided be software configurable and therefore inexpensive to the user, where software configurability is achieved because the microprocessor pins can be stimulated and sampled at less than realtime speed.

It is a further object of this invention to provide a means and method for automatically analyzing failed nodes within the UUT rom-to-CPU address/data path which is less costly and cumbersome than using a logic timing analyzer, which does not entail movement of many leads to different nodes numerous times and which does not require error prone interpreted measurements.

It is yet another object of this invention to provide a means and method to stimulate the UUT nodes repetitively so that data compression techniques such as digital signature analysis can be used to pinpoint faults in the UUT.

The present invention eliminates the existing UUT CPU as the signal source by replacing it with a kernel debugging module, which may be inserted in the UUT CPU pin socket. By the replacement, the CPU of the kernel debugging module may execute a ROM function routine to emulate the read instruction of the replaced CPU to verify the UUT rom-to-CPU- address/data path. If unable to successfully execute a read instruction, a ROM stimulus routine may be executed to toggle all address, data and pertinent control lines. When the stimulus is repetitively applied to the rom-to-CPU-address/data path, known digital signature analysis techniques may be used to pinpoint the failed node. A stuck lines routine may also be executed to test all the connections between the CPU pins and the unit-under-test rom socket for stuck nodes by driving all to logic low and high and sensing those conditions. When the stuck node or nodes, are found and repaired in this manner, testing of the remainder of the CPU kernel and the UUT may be accomplished with the rom emulator. Moreover, in many instances, the ROM stimulus routine and/or the stuck lines routine may be executed without prior execution of the ROM function routine.

The kernel debugging module of the present invention is a separate "intelligent" module which obtains UUT CPU specific information from a host computer, as for example, the Temco 4400 or 7700 ATE System manufactured by Temco Instruments, Inc. regarding UUT CPU pinouts, address, data, control and read pattern specifics. Since most stuck kernel faults are hard failures (not timing related) testing at system speed is not necessary. Therefore, the plug inserted in the UUT CPU socket can be driven by a general purpose microcontroller. All the UUT CPU pins are driven or sensed by parallel I/O port pins from the microcontroller; emulation of the read instruction is then a matter of toggling and sensing appropriate address, control and data lines.

The hardware system of the kernel debugging module of the present invention is software configurable, obviating the need for a different kernel debugging module for each microprocessor type. The main requirement for adapting the hardware for a specific UUT CPU is the plug type required. The kernel debugging module may be configured to support 40, 48 and 64 pin dual-in-line package UUT CPUs or other plug types. Consistent with the underlying concept, most 16 and 32 (and larger when commercially available) bit UUT CPUs are supported through expansion and obtaining of commercially available leadless-chip-carrier and pin-grid-array adapter sockets.

In operation of the ROM stimulus program, the kernel debugging module attempts to "read" a known pattern resident in the UUT memory. The pattern can be provided from a rom actually plugged into the UUT rom socket or by a pattern uploaded from the host computer into shared ram of the rom emulator accessed through the UUT rom socket. The embodiment of the invention described hereafter employs the method wherein the pattern is uploaded into a rom emulator and accessed through the UUT rom socket. This pattern can be generic in content for any CPU type; there is no need for it to change.

By attempting to "read" the entire contents of the UUT rom, all the address lines of the address space used by the rom will be tested. If the attempt is unsuccessful, the "read" routine will loop, providing repetitive stimulus signals which can be used for digital signature analysis. By comparing signatures on all nodes in the unit-under-test with those previously found on a know-good-unit, defective buffers, decoders, solder bridges or copper track defects can be found. Once the defect is found and corrected, the stuck kernel condition no longer exists and system testing via rom emulation can proceed.

These and other objects of the invention will become apparent from the following specification taken together with the drawings and claims.

PREFERRED EMBODIMENT OF THE INVENTION

Figure 1:
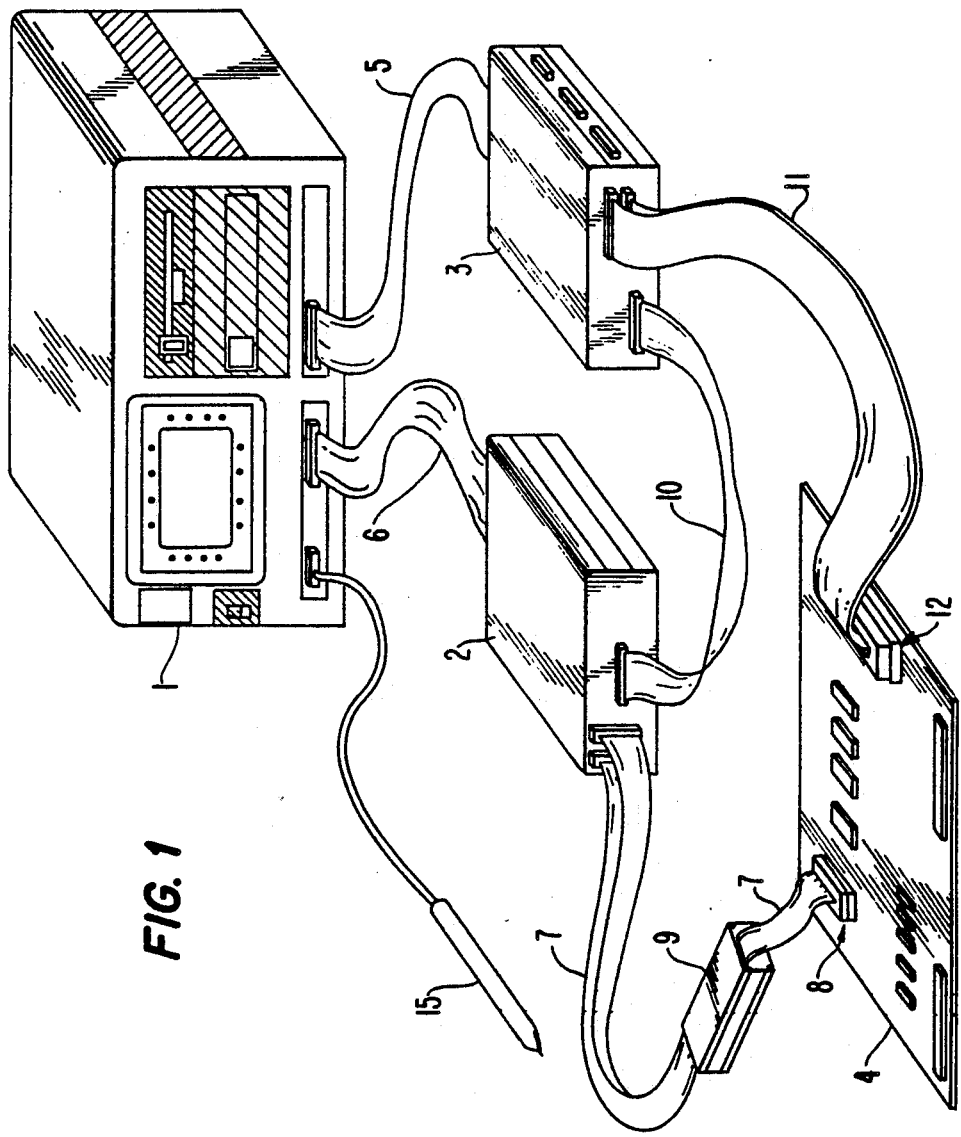
FIG. 1 is a diagrammatic illustration of an illustrative embodiment of the main system physical components of the invention.

Reference should be made to the drawing where like reference numerals refer to like elements.

Figure 2:
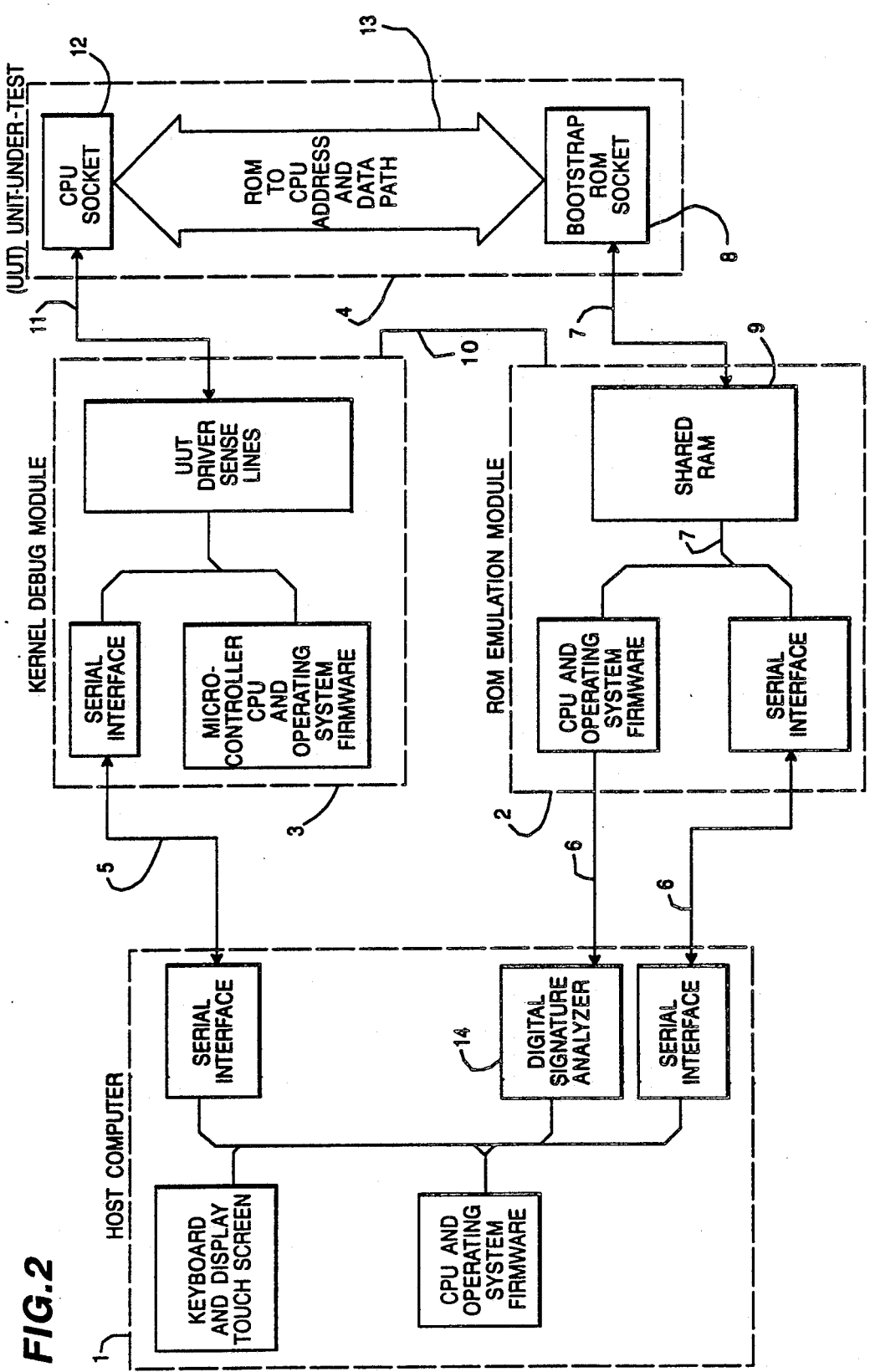
FIG. 2 is a block diagram depicting the system interconnections among the main system physical components shown in FIG. 1, including a typical 8 bit microprocessor system in the unit-under-test (UUT).

The host computer 1, rom emulation module 2, kernel debugging module 3 and unit-under-test 4, as shown in FIGS. 1 and 2 constitute the major units relating to the invention. The host computer provides the operator interface, where the host computer may include a touch-sensitive CRT screen. The host computer 1 can, however, be any personal or desktop computer with a keyboard or mouse and CRT, flat panel display or similar operator interface. The host computer communicates with the rom emulation module 2 and the kernel debugging module 3 through RS232 serial communications channels, 5 and 6, respectively. The rom emulation module 2 communicates with the unit-under-test 4 by a set of address and data lines 7 which attach to the unit-under-test 4 at a bootstrap rom socket 8. On the address and data lines intermediate the unit-under-test 4 and the rom socket 8 is a ram (random access memory) 9 which is an element of the rom emulator. The rom emulation module 2 is in communication with the kernel debugging module 3 by a flat ribbon cable 10. Further, the kernel debugging module is in communication with the unit-under-test 4 by a set of pin driver/sensor cables 11 which connect at the CPU pin socket 12 of the unit-under-test 7.

The serial channel 6 between host computer 1 and the rom emulation module 2 is primarily used (in conjunction with the kernel debugging module 3) to send a command which uploads a pattern into read/write memory (shared ram 9) connected to the rom socket 8 of the unit-under-test 4.

The serial channel 5 between the host computer 1 and the kernel debugging module 3 transmits pass/fail messages to host computer 1. It also passes CPU specific pinout data and address/data/control lines logic and timing information to the kernel debugging module 3. This information is then set up in the kernel debugging module 3 to test the rom-to-CPU address/data paths 13 (FIG. 2) of the unit-under-test 4, the paths 13 extending between the bootstrap rom socket 9 and the CPU pin socket 12.

The kernel debugging module 3 generates Start/-Stop/Clock/Qualify signals which are routed via the flat ribbon cable 10 to the rom emulation module 2 and via serial communications channel 6 to the digital signature analyzer 14 in the host computer 1. The signature analyzer 14 is used in conjunction with a probe 15 of the host computer 1 to pinpoint the failed mode of the rom-to-CPU-address/data paths 13.

The rom-to-CPU-address/data paths 13 will typically consist of address and data lines, CPU control lines, address latches, data buffers and control steering logic as discussed above with respect to FIG. 4. When the rom emulation technique is used, any fault in paths 13 result in the "stuck kernel" problem. Diagnosis and verification of this pathway under the control of kernel debugging module 3 constitutes the most important aspect of the invention.

Figure 3:
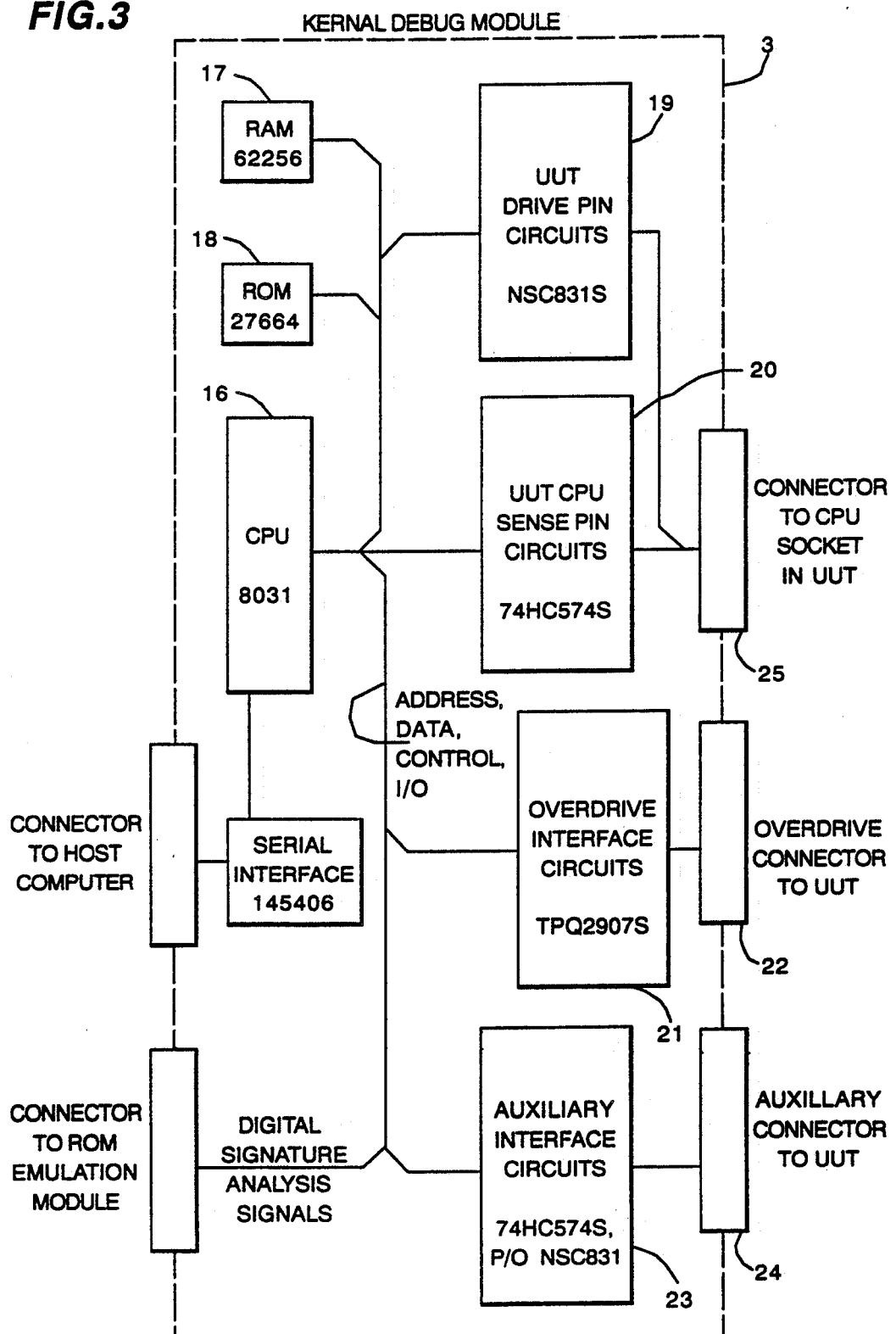
FIG. 3 is the detailed block diagram of an illustrative embodiment of a kernel debugging module in accordance with the present invention.

Referring to FIG. 3, the main system board of the kernel debugging module may include a high speed microcontroller CPU 16, selected primarily for the large number of I/O ports it offers. The CPU operating system memory of the kernel debugging module 3 resides in a rom 18, and UUT specific parameters are stored in a ram 17 after being uploaded serially from the host computer 1.

The many types of UUT CPUs which may be encountered by the kernel debugging module 3 require a high degree of flexibility in the ways the pins of the UUT CPU pin socket 12 can be accessed. For example, on the 8085 microprocessor, pin 21 is address line 8 but on the 8086 pin 21 is the Reset line. Therefore the UUT CPU drive/sense pin circuits 19 and 20 are designed such that each of the pins is bi-directional. Thus, software algorithms for each microprocessor type configure the pins as either outputs or inputs. Any pin may be enabled as an output always, or an input always, or may be changed by the algorithm during the test from an output to an input. Such would be the case for a UUT CPU where address and data are time-multiplexed on each pin.

UUTs in some applications contain microprocessors which are soldered onto the printed circuit board instead of plugging into sockets, as is the normal case. The invention provides for overdrive circuitry 21 capable of sourcing 300 milliamps. These overdrive lines are connected in this special case to drive certain UUT microprocessor inputs such as the direct-memory-access pin which would then cause the UUT CPU to set all the address, data and control line outputs to high-impedance state. Since the UUT CPU is soldered into the board, the UUT CPU connector 22 clips onto the top of the UUT CPU to gain electrical contact with the pins. In addition the overdrive connections are made in this manner to the DMA, reset, or other appropriate line on the UUT CPU to cause the bus lines to assume high-impedance or tri-state condition. After the tri-state condition is gained the kernel debugging module drive/-sense pins begin exercising the bus with a stuck lines test, a read pattern test and stimulus routine looping.

Auxiliary Interface Circuitry 23, whose function is similar to the other UUT CPU pin drive/sense circuits, is available to be connected to the UUT via separate leads. The auxiliary connector 24 for the auxiliary interface circuit 23 is physically separated from the UUT CPU connector 25. Because of the diverse types of microprocessors which may be encountered in UUTs these lines are added to provide extra bi-directional drive/sense capability.

Software to set up and control the direction of all pins, logic states and logic timing is uploaded from the host computer 1 and reside in ram 17 during each test type. These routines are written to be specific for each UUT microprocessor type, but there are common algorithm structures required for each. Following is a brief description of the algorithms and the test modes they support:

A set-up algorithm sets up bi-directional pins as address, data and control lines for the particular UUT CPU type. In particular, this algorithm determines which bi-directional lines from kernel debug module 3 are to be set up outputs and which lines are to be set up as inputs. The lines set up as outputs must be driven (high or low) properly so as to mimic the operation of the UUT CPU chip that the kernel debug module replaces.

A stuck lines test or algorithm drives all appropriate pins to logic high and low, and tests the pins to see if they were driven in each direction. Additionally this algorithm senses all the other pins to see if any changed states also, thereby identifying lines shorted to each other.

For example, the stuck lines test is used to test specified input and output lines from the UUT CPU. The test is performed by driving all lines of interest to a logic one and by then driving each line in turn to a logic zero. By monitoring all lines during each driving exercise, each line can be evaluated to be stuck high, stuck low, shorted to another line, or functioning correctly.

Figure 4:
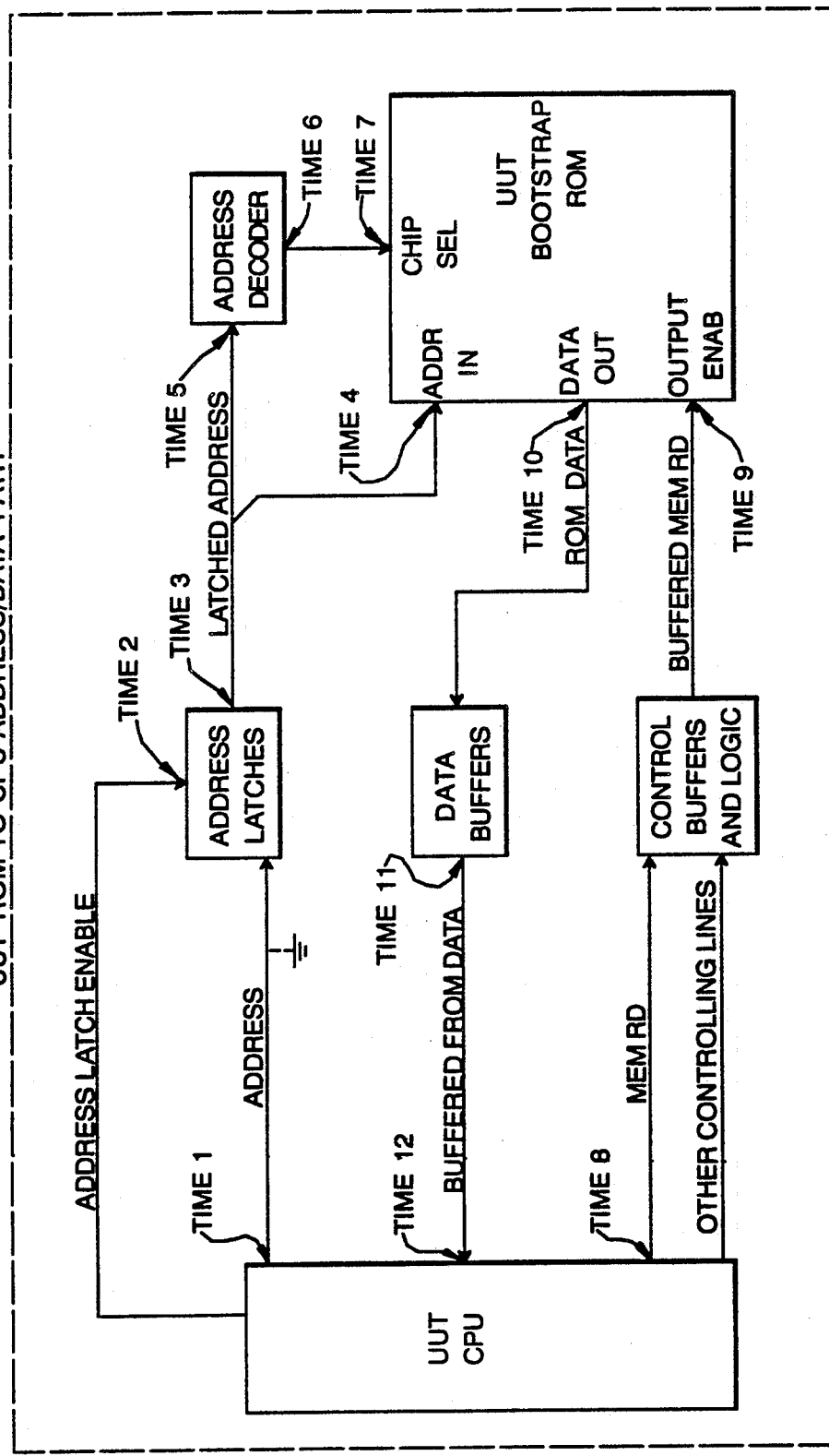
FIG. 4 is a block diagram of a typical unit-under-test rom-to-CPU address/data path.

Thus, suppose the input to the address latch of FIG. 4 connected to address line number 1 is shorted to ground. This condition is illustrated in the FIG. 4 by the dotted line connection to ground. A procedure which may be followed to locate the foregoing condition as is follows:

(1) ROM emulator 9 is connected to ROM socket 8 of UUT 4.

(2) The ROM emulator will fail its CPU test because of the above short—that is, because of the short, the UUT CPU (FIG. 4) is unable to communicate with the ROM emulator.

(3) The UUT CPU of FIG. 4 is removed and replaced with kernel debug module 3, which is connected to socket 12 of UUT 4.

(4) Module 3 will then fail the ROM functional test of FIG. 6, described below, when trying to read the ROM emulator 9, assuming this test is employed.

(5) Module 3 will also fail the stuck lines test, but the stucks line test reports that address line no. 1 is stuck low.

Figure 5:
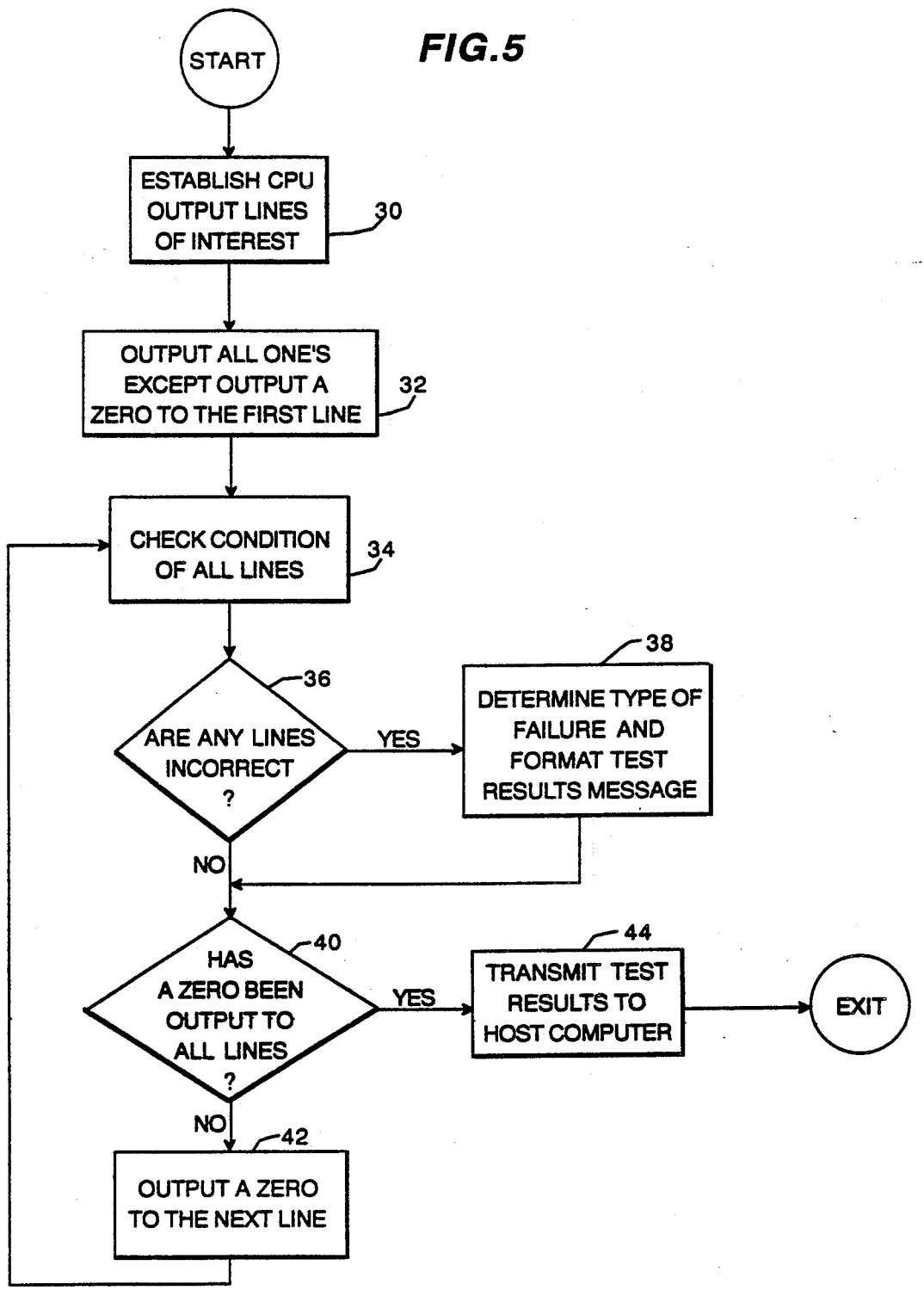
FIGS. 5, 6, 7, and 8 are flow charts of a stuck line algorithm, a ROM function algorithm, a ROM stimulus algorithm, and a memory map algorithm, respectively, executed by the kernel debug module of the present invention.

A flow chart of the stuck lines test is illustrated in FIG. 5 where after initialization of the routine at START, the CPU output lines of interest are established at 30. Next, logic ONE's are outputted by module 3 on all lines of interest except a logic ZERO is applied to the address line no. 1, for example, at step 32. The condition of all lines is then checked at step 34. At this time the short at address line no. 1 will be detected. At the next step 36, a determination is made as to whether any lines were incorrect. The answer is "yes" and at step 38 a message stating that address line number one is shorted is formatted. A determination is then made at step 40 to determine if all lines have been tested. If not, a logic ZERO is applied to the next line and logic ONE to the remaining lines at step 42. All lines are again checked at step 34 where at least steps 36 and 40 are repeated until all lines have been checked. Once all lines have been checked, the test results may be transmitted to host 1 where they may be displayed or otherwise recorded.

A ROM functional algorithm (according to memory-read-cycle requirements for the particular CPU type) sets up logic pattern outputs at the bi-directional pins to emulate a memory-read-cycle. An attempt is then made to read a pattern previously stored in RAM 9 (from host computer 1 via ROM emulation module 2). This ROM functional routine was referred to in the above-described stuck lines routine of FIG. 5 and is typically employed when the ROM emulator 2 fails its CPU test indicating a fault in the address/data path of FIG. 4. The UUT CPU of FIG. 4 is then removed and replaced by the kernel debug module 3 whereby the ROM functional routine may be executed to simulate the memory-read-cycle between beginning and ending address limits, in an attempt to read the contents of shared ram 9.

Since in many, if not most cases, it can be assumed a hard fault exists in address/data paths of FIG. 4 if the ROM emulator fails its CPU test, the ROM functional algorithm need not be executed. However, in some instances the fault may not be in address/data paths, but rather in the address decoder of FIG. 4, for example. In such instances, execution of the ROM function routine will locate this fault and, in particular, it can locate the particular address at which the address decoder malfunctions.

Figure 6:
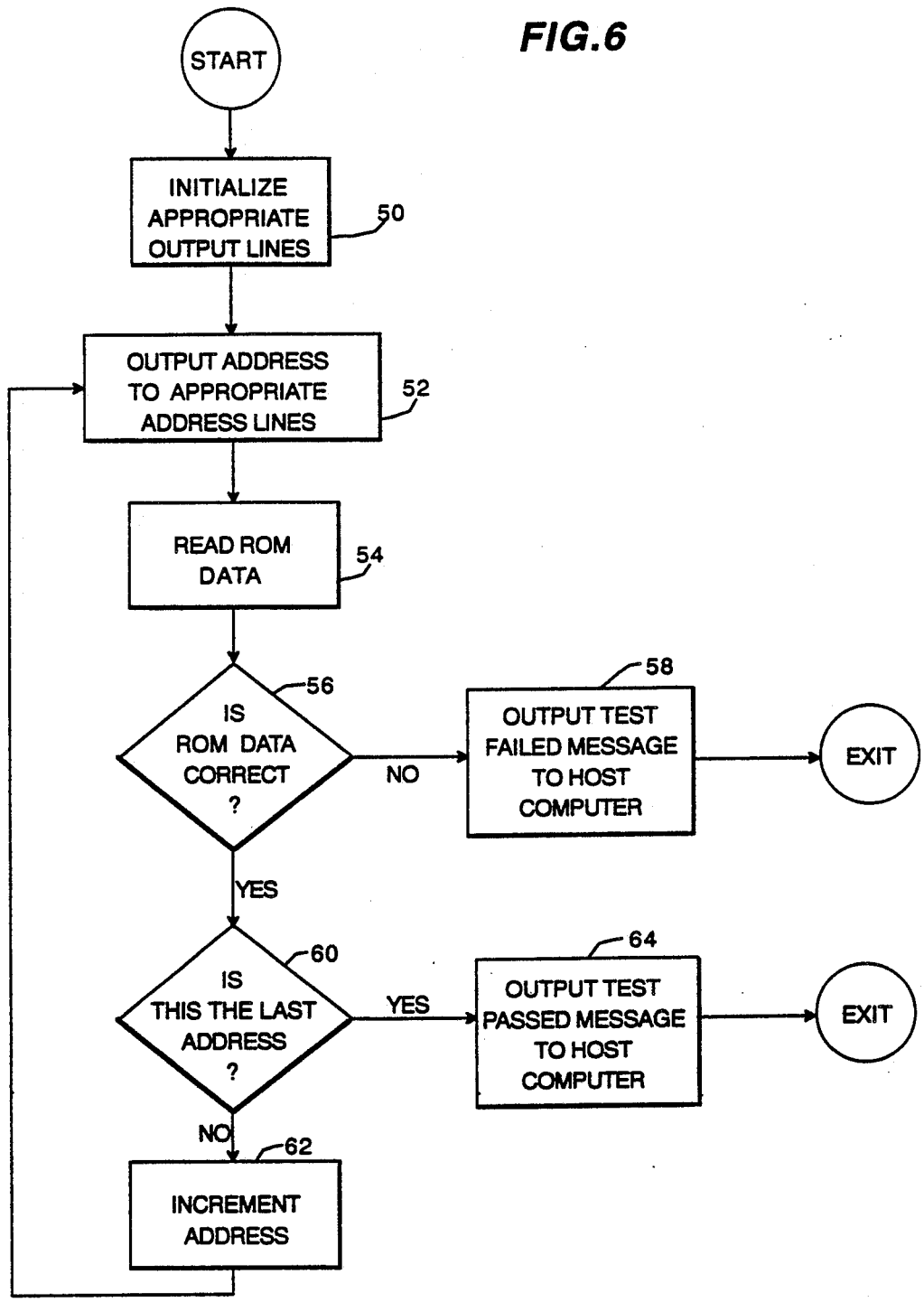

Reference should be made to FIG. 6 which is a flow chart of the ROM functional algorithm where at step 50 appropriate output lines of the module 3 are initialized. At step 52, the first address is applied to the address lines of FIG. 4 and at step 54, the pre-stored data from this address is read. A determination is then made to determine if the read data applied to module 3 corresponds to the pre-stored data. In particular, the routine effects a comparison between the read data and the pre-stored data, the later data being previously available to module 3. If the read data is not the same as the pre-stored data, a failed output message including the ROM address at which the failure occurred is outputted at step 58 to host computer 1. If the ROM data is correct, a determination is made at step 60 to determine whether the last address has been read. If not, the address is incremented at step 62, and steps 52, 54, and 56 are repeated until the last address is read at which time a passed-test message is transmitted to host 1.

Assuming the ROM functional test of FIG. 6 is failed or the ROM emulator fails its CPU test, the stuck lines test of FIG. 5 may be executed next, as described above. Assuming this test is passed, the ROM stimulus test of FIG. 7 should next be executed, it being understood, the ROM stimulus test may be executed before the stuck line test. Moreover, as discussed above, depending on the situation, the ROM function test may not be executed—that is, either the stuck line test and/or the ROM stimulus test may be executed immediately upon failure of the ROM emulator to pass its CPU test.

Figure 7:
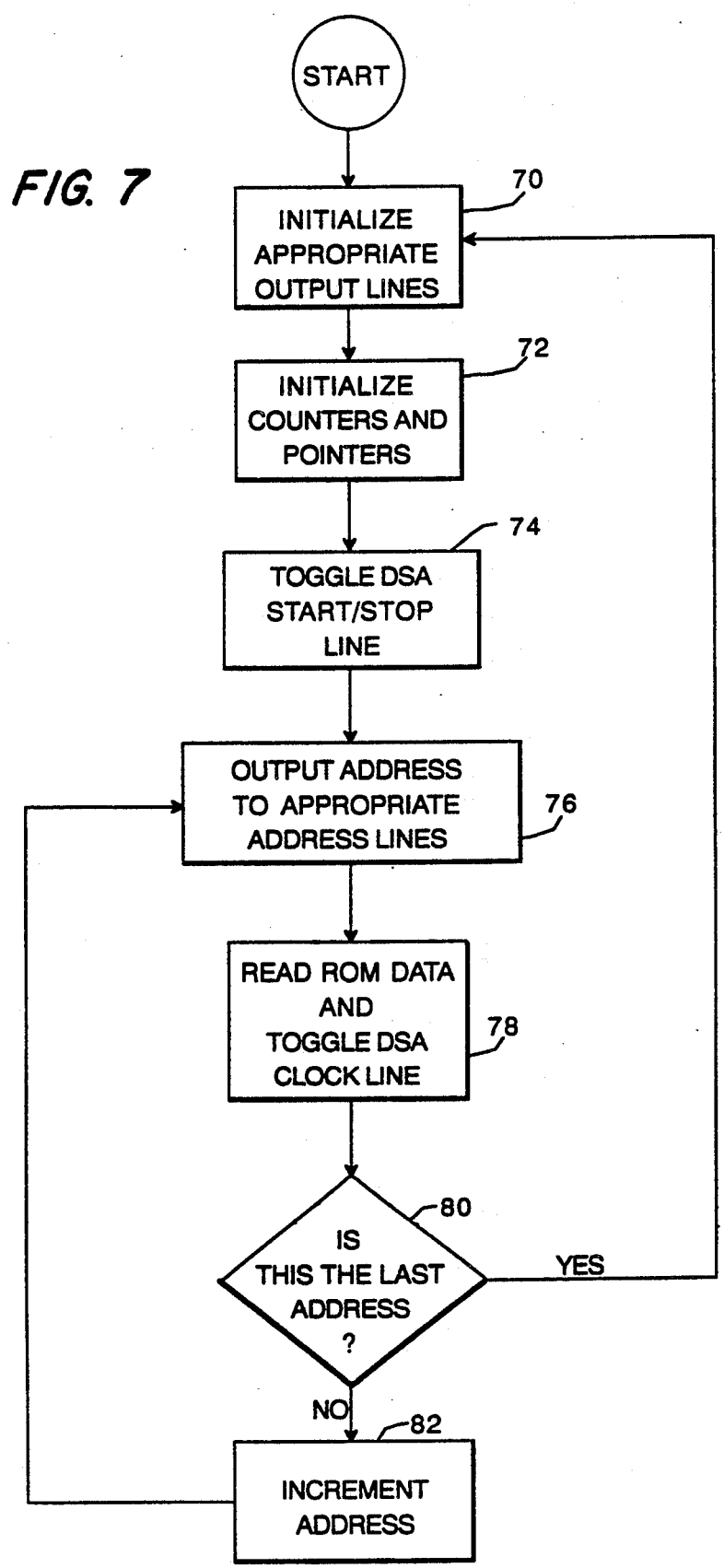

The ROM stimulus algorithm of FIG. 7 emulates memory-read cycles through the complete contents of shared ram and loops back, to provide repetitive stimulus to conduct digital signature analysis. As described above, this stimulus is executed when the memory-read cycles attempt of FIG. 6 has been unsuccessful, indicating a fault in the UUT rom-to-CPU-address/data path.

Having described an example of a stuck line fault with respect to the algorithm of FIG. 5, an example of failed kernel will now be described and, in particular, it is assumed, for example, the data buffer (FIG. 4) is defective on the line connected to data line number 3. A procedure which may be followed to locate this fault is as follows:

(1) ROM emulator 2 is connected to UUT 4.

(2) ROM emulator 2 fails its CPU test—that is, because of the defective data buffer, the UUT CPU (FIG. 4) is unable to communicate with the ROM emulator.

(3) The UUT CPU is removed and replaced with kernel debug module 3.

(4) Module 3 fails the ROM functional test of FIG. 6 trying to read the ROM emulator.

(5) Module 3 passes the stuck line test of FIG. 5.

(6) Module 3 executes the ROM stimulus routine of FIG. 7 whereby digital signature analysis (DSA) techniques may, if desired, be used.

(7) Assuming all inputs to UUT Bootstrap ROM socket 12 (FIG. 4) are functioning properly, the data lines of the UUT Bootstrap ROM socket are probed by probe 15 and found to give proper digital signatures.

(8) The data lines out of the data buffers are next probed by probe 15 and data line #3 will give an improper digital signature.

(9) Data line #3 going into the data buffer is probed and found to give proper digital signature.

(10) The control lines of the data buffer (if applicable) are probed and found to give proper digital signatures.

(11) The fault has thus been isolated to data output line #3 of the data buffer.

Thus, the ROM stimulus routine of the kernel debug module 3 provides a repetitive stimulus so that conventional digital signature analysis (DSA) techniques can be used to isolate a fault in the kernel. Digital signature analysis requires a start/stop signal and a clock signal to function properly. The ROM stimulus routine provides these signals. The start/stop signal is toggled each time the routine repeats. The clock signal is toggled once for each unique ROM address which is output by the ROM. This combination ensures that the digital signatures collected by data probe 15 are a complete representation of the data stream needed to successfully perform a "read" of the pre-stored pattern in the UUT ROM (or RAM 9) where the stored pattern need not necessarily be the same as that employed in the ROM function test. Each point in the data path needed to "read" the UUT ROM can be probed to obtain its unique digital signature. Faults can be identified by comparing the digital signatures of a UUT with those of a known good unit.

In FIG. 7, a flow chart of an illustrative ROM stimulus algorithm is shown for effecting the above steps. At step 70, appropriate output lines of module 3 are initialized. Next, at step 72, counters and pointers necessary to control looping and set upper and lower limits on the accessed memory, for example, are initialized. The DSA 14 START/STOP line is then toggled at step 74. The address of the first memory location of RAM 9, for example, to be read is then outputted by module 3 at step 76. At step 78, the data prestored at the first memory location is read from the ROM (or RAM 9) and at the same time the DSA 14 clock line is toggled so that the data occurring at the location of probe 15 may be applied to the DSA for comparison with the data occurring at this node of the known good unit. At step 80, a determination is made as whether all memory addresses have been accessed. If not, steps 76–80 are repeated until the last address is reached, at which time the routine returns to steps 72–74 where the DSA START/STOP line 14 is again toggled to stop the digital signature analysis.

Figure 8:
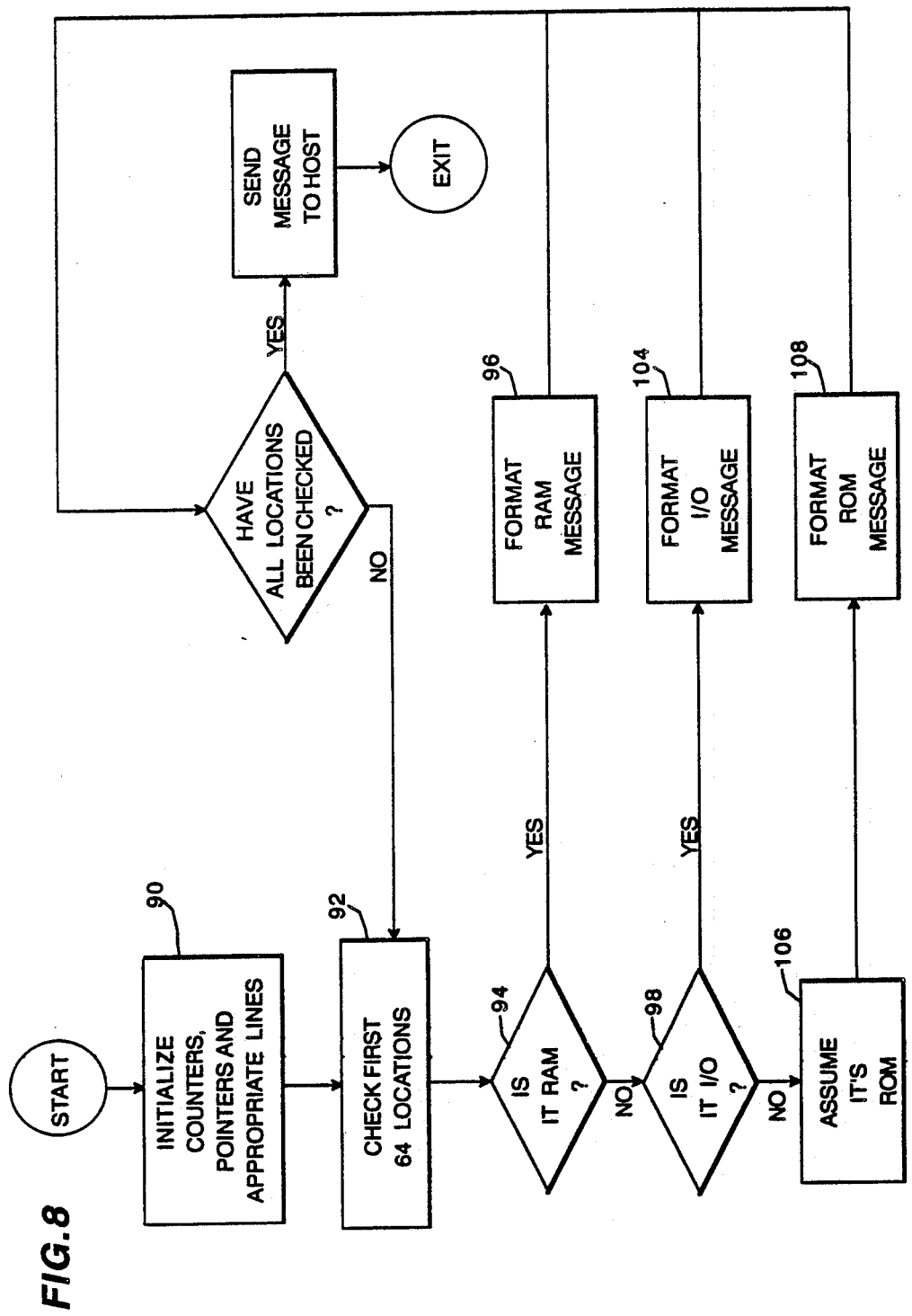

A memory map algorithm in accordance with another aspect of the invention is disposed within module 3 where this routine emulates memory-write and memory-read cycles through the total address space of the UUT microprocessor system in order to test whether ram is present. This algorithm through a decision process constructs a memory map, identifying system ram and rom, in other than the bootstrap rom locations. Thus, referring to FIG. 8, counters, pointers, and appropriate output lines are initialized at step 90. Next, a first group of 64 locations is checked at step 92. A decision is then made at step 94 as to whether these locations are RAM. In particular, if more than 64 contiguous locations can be written into and read from, it is assumed the locations are RAM because few, if any, computer manufacturers utilize RAM of less than 64 memory locations. A RAM message is then formatted at step 96 and then a decision is made at step 98 as to whether all locations have been checked. If not, a next group of 64 locations is checked at step 92 where step 94 is again executed. Assuming these locations are not RAM, it is assumed these locations constitute I/O if 64 or less contiguous address locations can be accessed and an appropriate message is formatted at step 100. If the locations are not RAM or I/O, a further test is made which tests for a non-driven data-bus during a read operation, signifying empty address space. By deduction then all other address locations are ROM.

In summary, the hardware/software configuration of the kernel debug module 3 is such that when (a) the UUT CPU is disabled such that there are no signals driven onto the address, data, and control lines of the UUT, whether by performing a bus request, by resetting the microprocessor, by removal of the microprocessor, or by any other means by which the UUT microprocessor may be prevented from driving the address, data and control lines of the UUT; (B) the kernel debug module 3 is electrically connected through cables, connectors, bed-of-nails, or any other form of electrical connection such that the signals of the module 3 may be driven onto the address, data, and control lines of the UUT; and (c) a known pattern is placed in the memory addressing space of the UUT, whether by rom emulation, by insertion of preprogrammed rom devices into the address space, or by download into UUT ram, the kernel debug module has a unique purpose, which is to detect, diagnose, and isolate hardware faults specifically in the kernel of the UUT. Further, the kernel debug module is unique in that it interfaces with the kernel of the UUT through bi-directional pins which are individually reconfigurable as inputs or outputs. Moreover, these bi-directional pins are used to drive address and control information onto the UUT kernel, and to access a known pattern of data which has been made resident in the address space of the UUT. Also, the bi-directional pins are used to allow definite detection of any combination of stuck, open, and shorted signal lines (which include all address, data, and control signals required for the kernel to operate properly. Further, the bi-directional pins are used to serially drive a data sequence onto each address, data and control line of the UUT kernel simultaneously, such that each line, when analyzed, will reveal a pattern different and distinct from that present on any other line being driven. Moreover, this pattern can be traced throughout the kernel, thus affording accurate diagnosis of faults in the kernel. Furthermore, digital signature analysis can be used to validate the foregoing data sequence, resulting in a unique signature for each line being driven. Finally, a memory map may also be constructed which identified system RAM and ROM in other than bootstrap rom locations.

What is claimed is:

1. Apparatus for testing the address/data paths between the ROM and CPU of a computer where said computer includes first means adapted to connect the ROM to said address/data paths so that data can be transferred between the CPU and the ROM via the data paths of the address/data paths and second means adapted to connect the CPU to said address/data paths so that addresses can be applied to an address decoder for the ROM via the address lines of the address/data paths and, said apparatus comprising memory means connected to said address decoder and said data liens via said first means, said memory storing test signals at a plurality of memory locations; and kernel debugging means connected to said address/data paths via said second means and including
(a) means for successively applying the addresses of said memory locations to said address decoder and for successively applying read signals which emulate those provided by said CPU to successively apply the test signals stored at the memory locations respectively corresponding to said addresses to said data lines of the tested address/data paths;
(b) means for storing predetermined data corresponding to the test signals as they occur at at least one selected node in address/data paths between the CPU and the ROM known to be fault free;
(c) means for enabling the sensing of data at the selected node; and
(d) comparison means for successively comparing (i) the test signals as they occur at said one selected node of the tested address/data paths with (ii) the said predetermined data until all said test signals have been applied to said data lines to thus determine if the tested address/data paths are fault free at said selected node.

2. Apparatus as claim 1 wherein said enabling means includes probe means for contacting said selected node of the tested address/data paths.

3. Apparatus as in claim 1 where said comparison means comprises a digital signature analyzer.

4. Apparatus for testing the address/data paths between the ROM and CPU of a computer where said computer includes first means adapted to connect e ROM to said address/data paths so that data can be transferred between the CPU, and the ROM via the data paths of the address/data paths and second means adapted to connect the CPU to said address/data paths so that addresses can be applied to an address decoder from the ROM via the address lines of the address/data paths and, said apparatus comprising;

memory means connected to said address decoder and said data liens via said first means, said memory storing predetermined data at a plurality of memory locations; and kernel debugging means connected to said address/data paths via said second means and including;
(a) means for applying at least one address of said memory locations to said address decoder and for applying at least one read signal which emulates that provided by said CPU to apply the predetermined data stored at the memory location corresponding to said one address to said lines of the address/data paths; and
(b) means for determining whether the predetermined data received from the data lines of the address/data paths is the same as that applied to the data lines from said memory location corresponding to said one address whether a determination can be made as to whether a fault exists in said address/data paths.

5. Apparatus as in claims 1 or 4 where said first means includes a connector socket and said memory means includes means for plugging the memory means into said connector socket.

6. Apparatus as in claim 5 where said memory means is a ROM having stored therein said predetermined data.

7. Apparatus as in claim 5 where said memory means is a RAM having stored therein said predetermined data.

8. Apparatus as in claims 1 or 4 where said second means includes a connector socket and said kernel debugging means includes means for plugging the kernel debugging means into the socket, or in the case the UUT CPU is soldered in, a clip-on assembly is included which attaches to, and accesses the CPU pins.

9. Apparatus as in claim 8 where said plug means includes bidirectional pins and said kernel debugging means includes means for formatting said pins to the pin configuration of the tested address/data paths.

10. Apparatus for testing the address/data paths between the ROM and CPU of a computer where said computer includes first means adapted to connect the ROM to said address/data paths so that data can be transferred between the CPU, and the ROM via the data paths of the address/data paths and second means adapted to connect the CPU to said address/data paths so that addresses can be applied to an address decoder for the ROM via the address lines of the address/data paths and, said apparatus comprising means connected to said second means for toggling at least selected ones of the data lines and/or the address lines of said address/data paths; and means responsive to the toggling of the data lines to detect a fault at at least one of said selected data lines.

11. Apparatus as in claim 10 where said toggling means includes means for successively applying a first binary level to successive ones of said selected data lines and a second binary level to the remaining selected data lines.

12. Apparatus as in claims 1, 4 or 10 including memory map means for determining whether said CPU utilizes RAM in addition to said ROM.

* * * * *